UNITED STATES PATENT OFFICE.

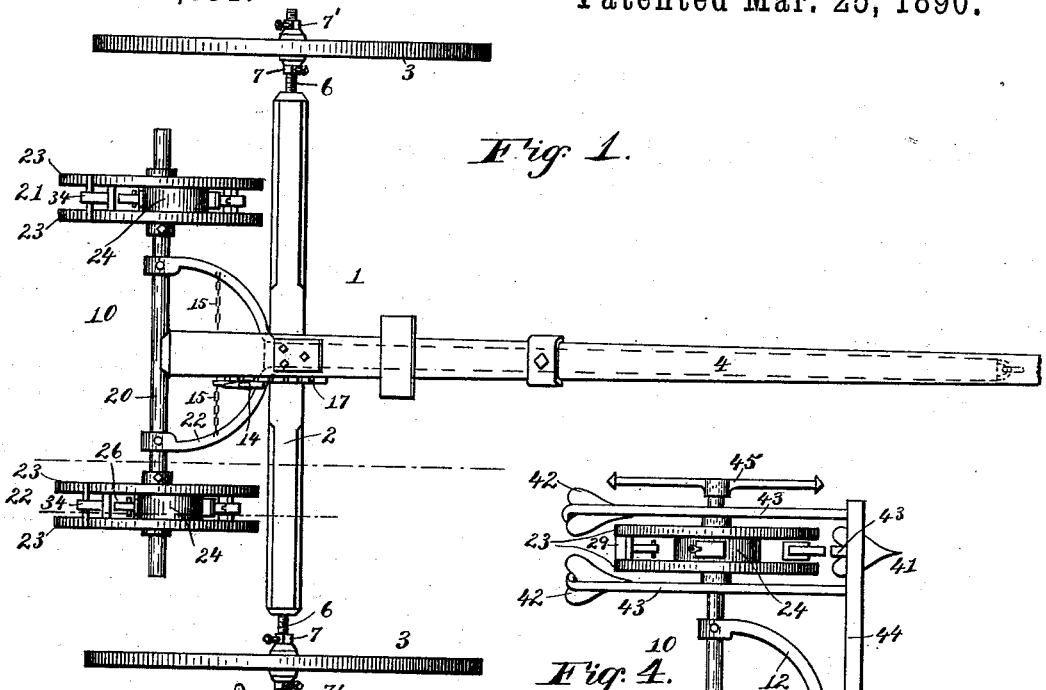

GEORGE W. PRICE, OF LITTLE ORLEANS, MARYLAND.

CORN-PLANTER.

SPECIFICATION forming part of Letters Patent No. 424,131, dated March 25, 1890.

Application filed July 19, 1889. Serial No. 318,026. (No model.)

*To all whom it may concern:*

Be it known that I, GEORGE W. PRICE, a citizen of the United States, and a resident of Little Orleans, in the county of Allegany and State of Maryland, have invented certain new and useful Improvements in Corn-Planters; and I do hereby declare the following to be a full, clear, and exact description of the invention, such as will enable others skilled in the art to which it appertains to make and use the same.

This invention relates to improvements in machines for planting corn, beans, and the like; and it has for its objects to provide mechanism for automatically depositing the desired quantity of corn in two parallel rows and at regular intervals apart, whereby the field can be check-rowed or planted in rows each way; to provide mechanism for lifting or adjusting the planting mechanism above and out of contact with the ground, so that said mechanism is thrown out of use, which is especially desirable in transporting the machine from one field to another, and finally to provide a machine which will carry out the ends above set forth and also be very simple and durable in construction, efficient and reliable in operation, and cheap of manufacture.

With these ends in view and such others as pertain to my invention it consists in the combination, with a main carrying-frame having an axle, the carrying-wheels, and a tongue, of a vertically-adjustable frame having its tongue pivoted or jointed to the tongue of the main carrying-frame, an axle supported in said adjustable frame and carrying the two rotary planting-wheels, and a lever fulcrumed on the main frame and connected to the supplemental frame to elevate or lower the latter at will, said lever being arranged within convenient reach of the driver's seat on the main frame, a spring-controlled latch being carried by the lever and engaging with a notched segment fixed on the main frame.

My invention further consists in the rotary planting-wheels, which are carried at each end of the axle in the supplemental adjustable frame, said planting-wheels being each provided with mechanism whereby the desired quantity of grain is planted at regular intervals apart, the two wheels planting the grain in parallel rows. Each planting-wheel has two delivery tubes or conduits, which are located at diametrically-opposite points, and the regulating-slides of said conduits are successively operated as the hopper rotates by means of a presser-foot which contacts with the ground.

Each planting-wheel consists of two laterally-spaced sections or members, between which is arranged the drum which carries the seed and serves as a hopper, and between said members of the planting-wheel are arranged the conduits or tubes for conducting the charge or quantity of corn to be planted as the machine progresses. Each conduit is provided at its outer extremity with points or blades for penetrating the ground, which points are extended or projected beyond the periphery of the planting-wheels the distance which it is desired to have said points penetrate the ground in order to properly plant the corn therein, and one of these points is carried by a movable side of the conduit or tube, which movable side is pivoted to the rigid side of the conduit. This movable side of the conduit is automatically operated when the points or blades are projected into the ground by means of a presser-foot, which is attached to said movable side and projects beyond the same, so as to come into contact with the ground, whereby the charge of grain is automatically and safely deposited in the ground. In order to regulate the quantity of corn planted each time the conduits enter the ground, I provide a regulating-slide in each conduit between its point of discharge and communication with the drum or hopper, and this slide is operated by the movable side of the conduit when the latter is operated by the presser-foot, so that the grain can pass through the slide and escape from the conduit when the discharge end thereof is opened in the manner described. As the hopper rotates and the presser-foot is elevated out of contact with the ground, the regulating-slide and movable side of the hopper are automatically returned to their former normal positions by a spring which is arranged to bear against the free end of the slide.

To enable others to more readily understand my invention, I will now proceed to a detailed description thereof in connection with the accompanying drawings, in which—

Figure 1 is a plan view of a corn-planter embodying my invention. Fig. 2 is a side elevation thereof, partly in section. Fig. 3 is an enlarged longitudinal sectional view through one of the planting mechanisms of one hopper. Fig. 4 is a detail plan view of a modified form of my invention.

Like numerals of reference denote corresponding parts in all the figures of the drawings, referring to which—

1 designates the main carrying-frame of my improved planter, which frame consists of an axle 2, the carrying-wheels 3, and a tongue 4, said frame also having a seat 5 to be occupied by the driver, as is obvious from an inspection of Figs. 1 and 2. The axle 2 is provided with spindles 6, on which the carrying-wheels are adjustable for the purpose of regulating the distance between said wheels, which are preferably spaced apart a distance equal to twice the space between the two planting-wheels presently referred to, and the wheels are held to their proper positions by means of nuts 7 7', two of which are provided for each wheel, said nuts being fitted on threads on said spindle and on opposite sides of the hub, and each nut having a binding-screw for holding the nut rigidly on the spindle.

10 is the supplemental adjustable frame, which consists of a tongue 11 and an arched piece 12, which arch is firmly and securely bolted to the rear end of the tongue. The tongue 11 is arranged immediately beneath the tongue 14 of the main frame in the same vertical plane, (see Figs. 1 and 2,) and the forward end of said tongue 11 is jointed or pivoted, as at 12', to the tongue 4 of the main frame to adapt the rear end of the supplemental frame to be raised or lowered vertically. This vertical adjustment of the supplemental frame is accomplished by means of a lever 14, which is fulcrumed on the axle of the main frame and has an arm 14', to which is connected a chain or link 15, that is secured to the arched part 12 of the supplemental frame, said lever being further provided with a latch 16, which is adapted to take into one of a series of notches in a segment 17, that is fixed to the main frame 1, whereby the lever and the supplemental frame can be locked and held in their adjusted positions.

In the free ends of the arched part 12 of the supplemental frame is journaled an axle 20, which carries two planting-wheels 21 22, one of said wheels being located at each end of the axle 20. The rear end of the supplemental frame terminates a short distance in rear of the axle 2 of the main frame, and the axle 20 of the supplemental frame is of less length than the axle 2, so that the planting-wheels 21 22 are located between the carrying-wheels of the main frame and a short distance in rear of the axle 2 thereof. It is obvious, however, that the supplemental adjustable frame can be made shorter, so that the axle 20 thereof is arranged below or in advance of the axle 2 of the carrying-frame, without departing from the spirit of my invention.

Each planting-wheel consists of two members or disks 23, which are separated laterally a sufficient distance to accommodate or receive a drum 24, that serves as the hopper for carrying the grain to be planted, said drum being of less diameter than the planting-wheel and arranged concentric therewith, the drum or wheel being suitably secured to the axle 20 and the drum being further provided with a door through which the grain can be introduced therein. Each planting-wheel is further provided with two radial delivery tubes or conduits 25 26, which are arranged at diametrically-opposite points in the drum and between the members of said planting-wheel, the inner ends of said delivery tubes or conduits being in communication with the drum by means of a nozzle 27, which projects from the drum and opens into the tube or conduit. (See Fig. 3.) The outer end of each conduit is provided with two blades or points 29 30, which are arranged at an angle with relation to each other, and are normally forced together, so as to close the outer end of said tube or conduit, one side or blade of the conduit being shorter than the other, so as to leave the outer extremity of the tube or conduit proper open, as clearly shown at $x$ in Fig. 3. Against this shorter side of the conduit or tube is arranged a movable side 31, which is inclined, as shown, the movable side being pivoted on ears or plates 32, which are fixed to the stationary part of the tube or conduit, on opposite sides thereof, and extend below the lower edge of the short side of the conduit to prevent the accidental escape of the corn, &c. One of the blades or points 30 is fixed by a bolt, as shown, to the rigid side of the case, while the other blade or point 29 is secured to the movable side 31, so as to move or play therewith, and thus open the lower end of the conduit or tube when the lower end of the movable side 31 is forced laterally away from the tube. This movable side 31 of the conduit also carries a pocket-plate 33, which is fixed to the inner face of the movable side, the lower end of said plate being bent or curved laterally away from the side 31, so as to bear or impinge against the rigid side of the tube when the parts are in their normal closed positions, the space between said plate and the rigid side of the tube constituting the pocket in which the charge of grain is retained until the movable side 31 is opened by its presser-foot 34 to plant the grain in the opening made in the ground by the blades or points 29 30. The blades or points extend or project beyond the periphery of the planting-wheel the distance it is desired to have the blades penetrate the ground, and said blades are adjustably connected, by means of bolts which pass through apertures in said blades, to the conduit, so that they can be arranged substantially flush with the periphery of the planting-wheel or projected at various distances beyond the same, for a purpose to be hereinafter explained.

The presser-foot 34 consists of a bowed or curved piece of metal, which is attached or pivoted at one end to the movable side 31, below the pivot thereof, and has its upper end connected by a link 35 to the upper end of said side 31 at a point some distance above the pivot of the same. This presser-foot extends or projects for some distance beyond the conduit and a short distance beyond the periphery of the planting-wheel, so that when the blades of the conduit have penetrated the ground and made the opening therein to receive the grain said presser-foot comes in contact with the ground, and by the pressure exerted thereby on the upper end of the movable side 31 the lower end of said side 31 is forced away from the rigid side of the tube, whereby the blades or points are separated and the pocket-plate drawn away from the blade 30, so that the charge of grain is safely deposited in the ground. Each delivery-tube is further provided with a regulating feed-slide 36, which is arranged transversely across the same and is fitted in openings made in opposite side walls of the tube. Said feed-regulating slide is provided with a transverse aperture 37, and one end thereof is normally forced against the upper end of the movable side 31 by means of a spring 38, which bears against the free end of the slide, as shown. The opening in the regulating-slide is closed when the parts are in their normal positions by means of a fixed covering-plate 39, which is arranged above the slide on one side of the tube, so as to prevent the grain in the upper part of the tube from escaping into the lower part of said tube through the opening in the slide, and when said slide is forced endwise by the movable side 31 and the presser-foot, so that its opening clears the covering-plate, the desired quantity of grain fills the opening in the slide, the grain being prevented from passing through the slide while in this position by means of another stop-plate 40, which is arranged below the slide on the opposite side of the tube from the covering-plate, the grain in the opening of the slide being permitted to fall into the pocket in the lower end of the delivery-tube when the pocket is closed by the presser-foot clearing the ground and the spring forcing the slide endwise to return the slide into such position that its opening clears the stop-plate 40 and is covered by the covering-plate.

The operation of my invention may be briefly described as follows: When it is desired to plant, the supplemental frame is lowered by means of the lever, so that the planting-wheels rest on the ground, and said wheels are rotated by frictional contact with the ground. The two wheels plant the grain in two parallel rows, and as the wheels rotate the two delivery-tubes on each wheel are alternately brought into vertical positions, so that the blades or points of each tube enter or penetrate the ground the desired distance. While the blades are still in the ground, the presser-foot comes in contact with the ground and thus separates the plates, so as to deposit the corn or grain in the opening made in the ground by the blades, the slide being forced inward by the movable side 31, so as to receive a new supply of grain simultaneously with the opening of the tube to plant, and as the wheel continues to rotate the presser-foot is raised out of contact with the ground and the blades are drawn from the ground, whereupon the spring forces the slide to its former position, which movement of the slide closes the movable side 31 and brings the opening in the slide into such position that the corn therein drops into the pocket in the lower end of the tube or conduit. The tubes of each planting-wheel are thus alternately operated to plant the corn at regular intervals, and as the planting-wheels are simultaneously operated the corn is planted in two parallel rows.

If desired, I may arrange the blades or points 29 and 30 of each tube flush with the periphery of the planting-wheel by adjusting said blades on the tube in an obvious manner, so that the blades will not penetrate the ground, but the parts are free to operate by the presser-foot in the manner just described. The furrow, when the parts are thus arranged, is to be opened by an opening-plow 41, arranged immediately in front of the planting-wheel, the grain, after it is deposited, being covered by two shovels 42, arranged in rear of the planting-wheel, the covering and opening shovels being carried by arms 43 and a beam 44, fixed to the supplemental frame, substantially as shown in the modified construction, Fig. 4. A marker 45 is fixed to each end of the axle 20, said marker consisting of two arms which project radially from the axle and are adapted to penetrate the ground to indicate the places where the corn is planted, whereby the machine may be guided in moving successively across the field.

I am aware that changes and alterations in the form and proportion of parts and details of construction can be made without departing from the spirit or sacrificing the advantages of my invention, and I would therefore have it understood that I do not confine myself strictly to the mechanism herein shown and described.

Having thus fully described my invention, what I claim as new, and desire to secure by Letters Patent, is—

1. In a corn-planter, the combination of a rotary planting-wheel having a drum 24, a delivery-tube 26, which communicates with said drum, having a movable pivoted side which carries a presser-foot, the point or blade 29, secured to the movable side and delivery-tube, a pocket-plate 33, fixed to one of said blades or points 29, and having its lower end bent or flanged to project beyond the exposed face of said plate, whereby a pocket is formed by said plate between the two points or blades above the lower extremities thereof when the latter are closed, and a spring-actuated slide fitted in the delivery-tube and arranged to be forced in one direction by the movable pivoted side, substantially as described, for the purpose set forth.

2. In a corn-planter, the combination of a rotary planting-wheel having a drum, a delivery-tube having a movable side and the blades or points, a reciprocating regulating-slide, a fixed covering-plate 39, arranged in the tube above the reciprocating slide on one side of a vertical line drawn centrally through said tube to cover the opening in the slide when the latter is in its normal position, a stop-plate arranged below the reciprocating slide on the other side of a vertical central line through the tube to arrest the escape of the grain through the opening in the slide when the latter is forced away from its normal position, a spring bearing against one end of the slide, and a presser-foot carried by the movable side of the delivery-tube, substantially as described.

3. In a corn-planter, the combination of a main frame, a supplemental frame pivotally connected thereto, a lever fulcrumed on the main frame and connected to the supplemental frame, a shaft 20, journaled in the supplemental frame, a rotary planting-wheel carried by said shaft and having a drum and feed-regulating devices, a bar 44, carried by the supplemental frame, the arms 43, fixed to the bar and arranged on opposite sides of the planting-wheel, and the opening and covering shovels carried by the bar and arms 44 43, substantially as described, for the purpose set forth.

4. In a corn-planter, the combination, with a main frame, of a supplemental frame consisting of the beam 11 and the arch 12, which are arranged below the main frame, a lever pivoted on the main frame and connected by an intermediate device with the arch of the supplemental frame, an axle 20, journaled in the arch of the supplemental frame, the rotary planting-wheels carried by said axle, each planting-wheel having a drum, a delivery-tube, (one or more,) each having a movable pivoted side, a presser-foot carried by said movable side, the reciprocating feed-regulating slide operated by said presser-foot, and the spring for returning the slide and side to their normal positions, substantially as described.

In testimony whereof I affix my signature in presence of two witnesses.

GEORGE W. PRICE.

Witnesses:
H. I. BERNHARD,
WILLIAM O. BELT.